United States Patent
Kato et al.

(10) Patent No.: US 11,499,492 B2
(45) Date of Patent: Nov. 15, 2022

(54) DIESEL ENGINE

(71) Applicant: KUBOTA Corporation, Osaka (JP)

(72) Inventors: Daichi Kato, Sakai (JP); Yuki Ishii, Sakai (JP); Hiroaki Imahara, Sakai (JP); Hiroaki Okano, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/613,014

(22) PCT Filed: Apr. 6, 2020

(86) PCT No.: PCT/JP2020/015578
§ 371 (c)(1),
(2) Date: Nov. 19, 2021

(87) PCT Pub. No.: WO2020/255537
PCT Pub. Date: Dec. 24, 2020

(65) Prior Publication Data
US 2022/0205403 A1    Jun. 30, 2022

(30) Foreign Application Priority Data

Jun. 18, 2019  (JP) .............................. JP2019-113184
Jun. 18, 2019  (JP) .............................. JP2019-113185
Oct. 28, 2019  (JP) .............................. JP2019-194924

(51) Int. Cl.
*F01N 3/00*    (2006.01)
*F02D 41/02*   (2006.01)
(Continued)

(52) U.S. Cl.
CPC ........... *F02D 41/029* (2013.01); *F01N 9/002* (2013.01); *F02D 9/04* (2013.01); *F02D 41/405* (2013.01);
(Continued)

(58) Field of Classification Search
CPC ........ F02D 41/029; F02D 9/04; F02D 41/405; F02D 2200/0802; F01N 9/002; F01N 3/023; F01N 2430/085
(Continued)

(56) References Cited

U.S. PATENT DOCUMENTS 6,491,016 B1 * 12/2002 Buratti ................ F02D 41/3827
                                                        123/299
9,140,157 B2 *  9/2015 Noma ..................... F01N 3/023
(Continued)

FOREIGN PATENT DOCUMENTS

JP    2004-183506 A     7/2004
JP    2005-307744 A    11/2005
(Continued)

OTHER PUBLICATIONS

English translation of Japanese Patent Application Publication No. JP 2012-067731 A (May 4, 2012) (Year: 2012).*
(Continued)

*Primary Examiner* — Jason D Shanske
(74) *Attorney, Agent, or Firm* — Panitch Schwarze Belisario & Nadel LLP

(57) ABSTRACT

Provided is a diesel engine capable of regenerating a DPF even during no-load and/or light-load operation. In a DPF regeneration process, opening-degree reduction control S2 for an exhaust-air throttle valve is performed after a start condition S1 of the regeneration process of the DPF in which PM is deposited is satisfied. When exhaust air reaches a temperature equal to or higher than a predetermined after-injection permissible temperature TA, after-injection control is subsequently started S5. Post-injection control is started S7 after the exhaust air reaches a temperature equal to or higher than a predetermined post-injection permissible temperature TP by combustion of after-injection fuel. The PM
(Continued)

deposited in the DPF is incinerated by the exhaust air increased in temperature by catalytic combustion of post-injection fuel in a valve downstream-side DOC.

20 Claims, 5 Drawing Sheets

(51) Int. Cl.
  *F01N 9/00* (2006.01)
  *F02D 9/04* (2006.01)
  *F02D 41/40* (2006.01)
  *F01N 3/023* (2006.01)
  *F01N 3/035* (2006.01)
  *F02D 43/00* (2006.01)

(52) U.S. Cl.
  CPC .............. *F01N 3/023* (2013.01); *F01N 3/035* (2013.01); *F01N 2560/06* (2013.01); *F02D 43/00* (2013.01); *F02D 2200/0802* (2013.01)

(58) Field of Classification Search
  USPC .......................................................... 60/295
  See application file for complete search history.

(56) References Cited

U.S. PATENT DOCUMENTS

| | | | |
|---|---|---|---|
| 2003/0033800 A1* | 2/2003 | Tonetti | F02D 41/405 60/285 |
| 2005/0092299 A1* | 5/2005 | Tonetti | F02D 41/0085 123/436 |
| 2005/0137779 A1* | 6/2005 | Gioannini | F02D 41/405 701/101 |
| 2011/0066354 A1* | 3/2011 | Cassani | F02D 41/0245 60/274 |

FOREIGN PATENT DOCUMENTS

| | | |
|---|---|---|
| JP | 2010-151058 A | 7/2010 |
| JP | 2012-67731 A | 4/2012 |
| JP | 2015-68233 A | 4/2015 |
| JP | 2016148259 A | 8/2016 |
| JP | 2017-223182 A | 12/2017 |

OTHER PUBLICATIONS

Office Action dated May 11, 2022 in Japanese Application No. 2019-113186.
Office Action dated Apr. 13, 2022 in Japanese Office Action 2019113184.
Office Action dated Apr. 13, 2022 in Japanese Application No. 2019-113185.
Int'l Search Report dated Jul. 7, 2020 in Int'l Application No. PCT/JP2020/015578.

* cited by examiner

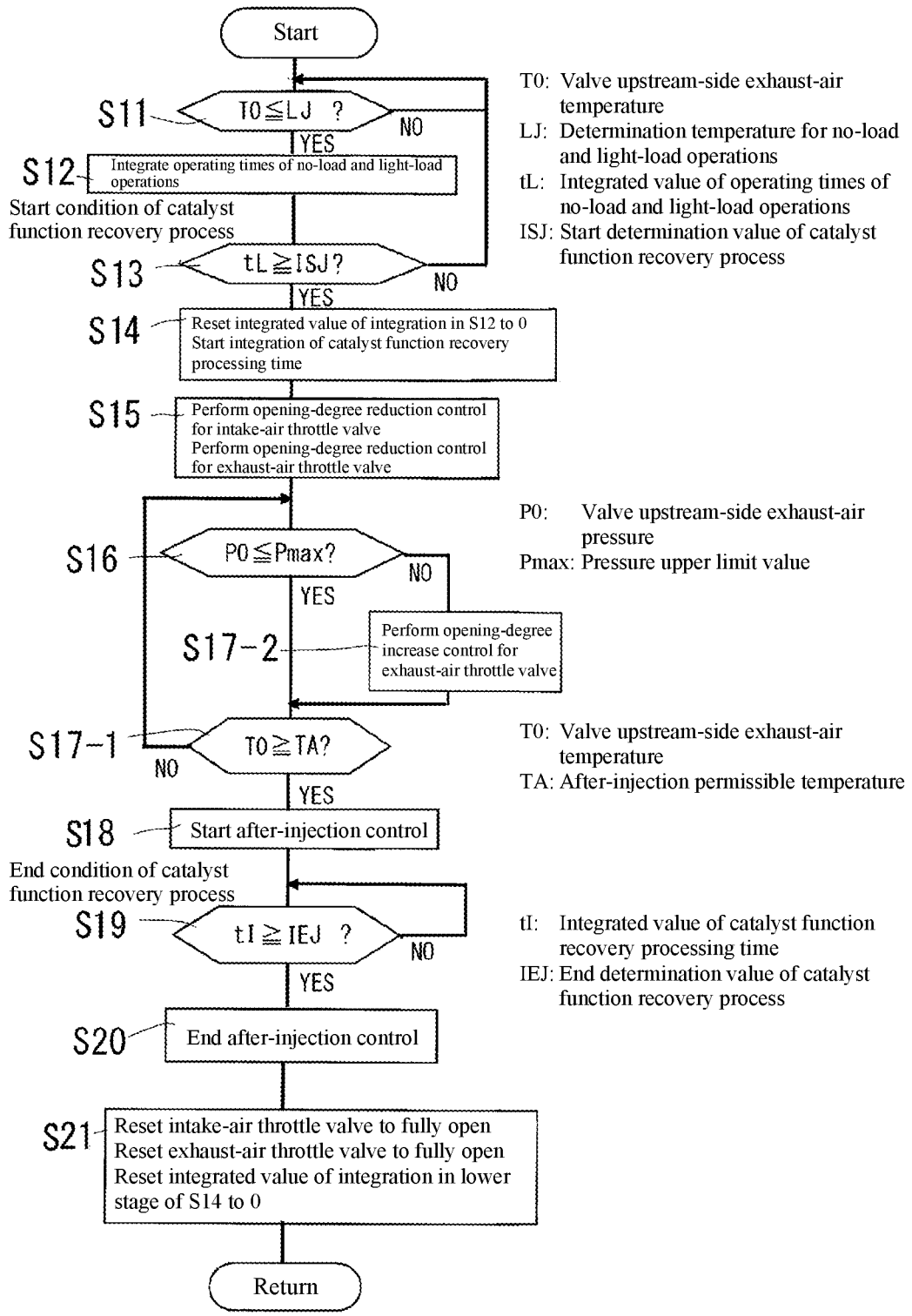
FIG. 3 Catalyst function recovery process of valve downstream-side DOC

FIG. 4

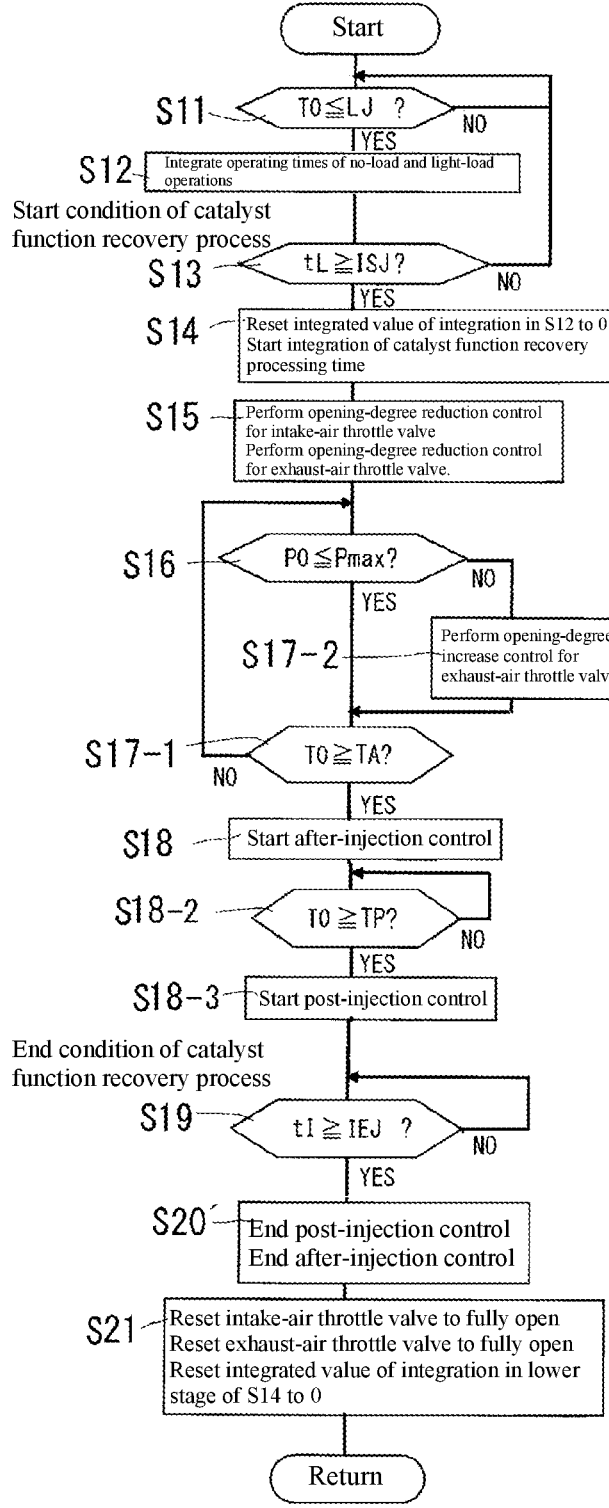

Catalyst function recovery process of valve upstream-side DOC

T0: Valve upstream-side exhaust-air temperature
LJ: Determination temperature for no-load and light-load operations
tL: Integrated value of operating times of no-load and light-load operations
ISJ: Start determination value of catalyst function recovery process P0: Valve upstream-side exhaust-air pressure
Pmax: Pressure upper limit value T0: Valve upstream-side exhaust-air temperature
TA: After-injection permissible temperature T0: Valve upstream-side exhaust-air temperature
TP: Post-injection permissible temperature tI: Integrated value of catalyst function recovery processing time
IEJ: End determination value of catalyst function recovery process

FIG. 5

(Equation 1) $$G = \frac{P0\, A}{\sqrt{RT0}} \sqrt{\frac{2\gamma}{\gamma-1}\left[\left(\frac{P1}{P0}\right)^{\frac{2}{\gamma}} - \left(\frac{P1}{P0}\right)^{\frac{\gamma+1}{\gamma}}\right]}$$

|  |  | Unit |
|---|---|---|
| G: | Mass flow rate of exhaust air | (kg/s) |
| P0: | Valve upstream-side exhaust-air pressure | (kPa) |
| A: | Effective cross-sectional area of exhaust-air path | ($m^3$) |
| R: | Gas constant | (J/K·mol) |
| T0: | Valve upstream-side exhaust-air temperature | (K) |
| $\gamma$: | Heat capacity ratio of exhaust air | |
| P1: | Valve downstream-side exhaust-air pressure | (kPa) |

(Equation 2) $$G = \rho 0 \times V$$

|  |  | Unit |
|---|---|---|
| G: | Mass flow rate of exhaust air | (kg/s) |
| $\rho 0$: | Density of exhaust air | (kg/$m^3$) |
| V: | Volume flow rate of exhaust air | ($m^3$/s) |

(Equation 3) $$V = \{G + Q \times \rho 1\} \times \{T0/T3\} \times \{P3/(P3+\Delta P)\} / \rho 3$$

|  |  | Unit |
|---|---|---|
| V: | Volume flow rate of exhaust air | ($m^3$/s) |
| G: | Mass flow rate of exhaust air | (kg/s) |
| Q: | Fuel injection amount | ($m^3$/s) |
| $\rho 1$: | Light oil density | (kg/$m^3$) |
| T0: | Valve upstream-side exhaust-air temperature | (K) |
| T3: | Normal temperature | (K) |
| P3: | Atmospheric pressure | (kPa) |
| $\Delta P$: | Differential pressure between inlet and outlet of DPF | (kPa) |
| $\rho 3$: | Air density | (kg/$m^3$) |

(Equation 4) $$P1 = P3 + \Delta P$$

|  |  | Unit |
|---|---|---|
| P1: | Valve downstream-side exhaust-air pressure | (kPa) |
| P3: | Atmospheric pressure | (kPa) |
| $\Delta P$: | Differential pressure between inlet and outlet of DPF | (kPa) |

DIESEL ENGINE

CROSS-REFERENCE TO RELATED APPLICATIONS

This application is a Section 371 of International Application No. PCT/JP2020/015578, filed Apr. 6, 2020, which was published in the Japanese language on Dec. 24, 2020, under International Publication No. WO 2020/255537 A1, which claims priority under 35 U.S.C. § 119(b) to Japanese Application No. 2019-113184, filed Jun. 18, 2019, Japanese Application No. 2019-113185, filed Jun. 18, 2019, and Japanese Application No. 2019-194924, filed Oct. 28, 2019, the disclosures of each of which are incorporated by reference herein.

TECHNICAL FIELD

The present invention relates to a diesel engine, and more particularly to a diesel engine capable of regenerating a DPF even during no-load and/or light-load operation.

BACKGROUND ART

Conventionally, as a diesel engine, there is known a diesel engine in which, when a regeneration start condition of a DPF is satisfied by deposition of PM, post-injection control is started after activation of a DOC, exhaust air is increased in temperature to a DPF regeneration temperature by catalytic combustion of post-injection fuel in the DOC, and the PM deposited in the DPF is incinerated (see, for example, Patent Document 1).

PRIOR ART DOCUMENT

Patent Document

Patent Document 1: Japanese Patent Application Laid-open No. 2010-151058 (see FIGS. 1 and 2)

SUMMARY OF THE INVENTION

Problems to be Solved by the Invention

<<Problem>> There is a possibility that the DPF cannot be regenerated during no-load and light-load operations.

In the conventional engine described above, an opening degree of an intake-air throttle valve is narrowed at the start of DPF regeneration. However, the temperature rise efficiency of the exhaust air is low only by this, and there is a possibility that the DOC is not activated, post injection cannot be performed, and the DPF cannot be regenerated during no-load and light-load operations when an exhaust-air temperature is low.

An object of the present invention is to provide a diesel engine capable of regenerating a DPF even during no-load and/or light-load operation.

Solutions to the Problems

A configuration of the invention of the present application is as follows.

As shown in FIG. 1, a diesel engine includes: a fuel injection device (3) configured to inject fuel (2) into a combustion chamber (1); an exhaust-air throttle valve (5) disposed in an exhaust-air path (4); a valve downstream-side DOC (6) disposed on an exhaust downstream side of the exhaust-air throttle valve (5); a DPF (7) disposed on an exhaust downstream side of the valve downstream-side DOC (6); and an electronic control device (8) configured to control an opening degree of the exhaust-air throttle valve (5) and fuel injection of the fuel injection device (3), as shown in FIG. 2, a regeneration process of the DPF (7) is performed, and in the regeneration process of the DPF (7), opening-degree reduction control (S2) for the exhaust-air throttle valve (5) is performed after a start condition (S1) of the regeneration process of the DPF (7) in which PM is deposited is satisfied, after-injection control is started (S5) after exhaust air (9) reaches a temperature equal to or higher than a predetermined after-injection permissible temperature (TA), post-injection control is started (S7) after the exhaust air (9) reaches a temperature equal to or higher than a predetermined post-injection permissible temperature (TP) by combustion of after-injection fuel, and the PM deposited in the DPF (7) is incinerated by the exhaust air (9) increased in temperature by catalytic combustion of post-injection fuel in the valve downstream-side DOC (6) shown in FIG. 1.

Effects of the Invention

The invention of the present application has the following effects.

<<Effect 1>> the DPF (7) can be Regenerated Even During No-Load and/or Light-Load Operation.

In this engine, as shown in FIG. 2, when the start condition (S1) of the regeneration process of the DPF (7) is satisfied, an increase in back pressure due to a decrease in the opening degree of the exhaust-air throttle valve (5) and the combustion of the after-injection fuel occur. Therefore, the valve downstream-side DOC (6) shown in FIG. 1 is activated and the DPF (7) can be regenerated by post injection even during no-load and/or light-load operation in which the temperature rise efficiency of the exhaust air (9) is high and an exhaust-air temperature is low as compared with the case of the intake throttle.

<<Effect 2>> Engine Output can be Increased.

In this engine, since the temperature of the exhaust air (9) is increased by the combustion of the after-injection fuel, the degree of decrease in the opening degree of the exhaust-air throttle valve (5) shown in FIG. 1 can be small, output loss due to the back pressure is small, and the engine output can be increased.

<<Effect 3>> A Deteriorated Catalyst Function of the Valve Downstream-Side DOC (6) can be Recovered During Regeneration of the DPF (7).

In this engine, even in a case where an unburned deposit of unburned fuel or PM is deposited in the valve downstream-side DOC (6) and the catalyst function thereof is deteriorated due to continuation of the no-load and/or light-load operation with a low exhaust-air temperature, when the start condition (S1) of the regeneration process of the DPF (7) is satisfied as shown in FIG. 2, the temperature of the exhaust air (9) is increased by a decrease in the opening degree of the exhaust-air throttle valve (5) or after injection, the unburned deposit is vaporized or burned, and the deteriorated catalyst function of the valve downstream-side DOC (6) shown in FIG. 1 can be recovered at the time of regeneration of the DPF (7). In addition, since there is no unburned deposit that is a cause of white smoke, generation of white smoke is also suppressed.

<<Effect 4>> the Temperature Rise Efficiency of the Exhaust Air (9) is High.

As compared to a structure different from this engine, that is, a case where the exhaust-air throttle valve (5) is disposed on the exhaust downstream side of the DPF (7), in this engine, as shown in FIG. 1, the exhaust-air throttle valve (5) is disposed on the exhaust upstream side of the DPF (7). Therefore, the volume of the exhaust-air path (4) on the exhaust upstream side of the exhaust-air throttle valve (5) is reduced, a valve upstream-side exhaust-air pressure (P0) is rapidly increased by the decrease in the opening degree of the exhaust-air throttle valve (5), and the temperature rise efficiency of exhaust air (9) is high.

<<Effect 5>> Valve Ringing Sound of the Exhaust-Air Throttle Valve (5) is Hardly Emitted to the Outside of the Exhaust-Air Path.

In this engine, as shown in FIG. 1, the valve downstream-side DOC (6) and the DPF (7) are disposed on the exhaust downstream side of the exhaust-air throttle valve (5), so that the valve ringing sound of the exhaust-air throttle valve (5) is hardly emitted to the outside of the exhaust-air path (4).

BRIEF DESCRIPTION OF THE DRAWINGS

FIG. 3 is a flowchart of a catalyst function recovery process of a valve downstream-side DOC of the engine in FIG. 1.

FIG. 4 is a flowchart of a catalyst function recovery process of a valve upstream-side DOC of the engine in FIG. 1.

FIG. 5 shows relational equations used to calculate a valve upstream-side exhaust-air pressure (P0) of the engine in FIG. 1, in which Equation 1 is a relational expression of a mass flow rate (G) of an exhaust air (9), the valve upstream-side exhaust-air pressure (P0), and the like, Equation 2 is a relational expression of the mass flow rate (G) of the exhaust air (9), a volume flow rate (V) of the exhaust air (9), and the like, Equation 3 is a relational expression of the volume flow rate (V) of the exhaust air, the mass flow rate (G) of the exhaust air, a fuel injection amount (Q), and the like, and Equation 4 is a relational expression of a valve downstream-side exhaust-air pressure (P1), an atmospheric pressure (P3), and a differential pressure (ΔP) between an inlet and an outlet of a DPF (7).

EMBODIMENT OF THE INVENTION

FIGS. 1 to 5 are diagrams for describing a diesel engine according to an embodiment of the present invention, and in this embodiment, a common rail type vertical straight multicylinder diesel engine will be described.

A configuration of this engine is as follows.

Figure 1:
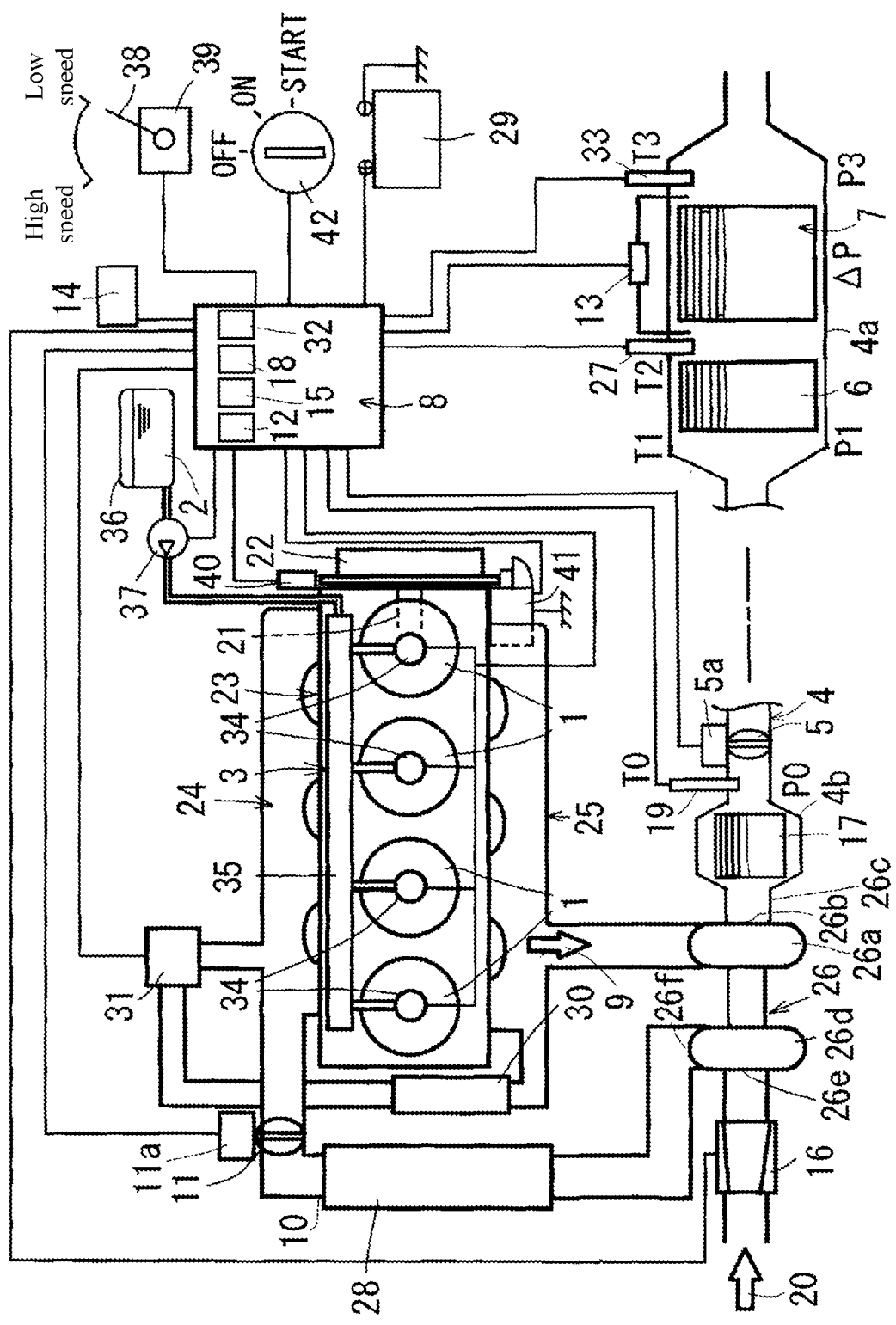
FIG. 1 is a schematic diagram of a diesel engine according to an embodiment of the present invention.

As shown in FIG. 1, a direction in which a crankshaft (21) is bridged is defined as a front-rear direction, a side on which a flywheel (22) is disposed is defined as a rear side, an opposite side thereof is defined as a front side, and an engine width direction orthogonal to the front-rear direction is defined as a lateral direction.

As shown in FIG. 1, this engine includes an intake manifold (24) assembled to one lateral side of a cylinder head (23) and an exhaust manifold (25) assembled to the other side of the cylinder head (23).

As shown in FIG. 1, this engine includes an electronic control device (8).

The electronic control device (8) is an engine ECU. The engine ECU is an abbreviation of an electronic control unit and is a microcomputer.

As shown in FIG. 1, this engine includes an exhaust device.

The exhaust device includes the exhaust manifold (25), an exhaust turbine (26a) of a supercharger (26) connected to the exhaust manifold (25), and an exhaust lead-out passage (26c) led out from an exhaust outlet (26b) of the exhaust turbine (26a).

As shown in FIG. 1, this engine includes an intake device.

The intake device includes a compressor (26d) of the supercharger (26), an intake-air flow rate sensor (16) provided on an intake upstream side of an intake inlet (26e) of the compressor (26d), an intercooler (28) disposed between a supercharging air outlet (260 of the compressor (26d) and the intake manifold (24), an intake-air throttle valve (11) disposed between the intercooler (28) and the intake manifold (24), an EGR cooler (30) disposed between the exhaust manifold (25) and the intake manifold (24), and an EGR valve (31) disposed between the EGR cooler (30) and the intake manifold (24). EGR is an abbreviation of exhaust air recirculation.

The intake-air throttle valve (11) and the EGR valve (31) are both electric on-off valves, and are electrically connected to a power source (29) via the electronic control device (8). The intake-air flow rate sensor (16) includes an intake temperature sensor and is electrically connected to the electronic control device (8). The power source (29) is a battery.

As shown in FIG. 1, this engine includes a common rail type fuel injection device (3).

The fuel injection device (3) includes fuel injection valves (34) provided in respective combustion chambers (1), a common rail (35) that accumulates fuel injected from the fuel injection valves (34), and a fuel supply pump (37) that pumps the fuel from a fuel tank (36) to the common rail (35).

The fuel injection valve (34) includes an electromagnetic on-off valve, and the fuel supply pump (37) includes an electric pressure adjusting valve, which are electrically connected to the power source (29) via the electronic control device (8).

As shown in FIG. 1, this engine includes a speed governor.

The speed governor includes an accelerator sensor (39) that detects a set position of an accelerator lever (38) that sets a target rotational speed of the engine, and an actual engine speed sensor (40) that detects an actual rotational speed of the engine. The sensors (39) and (40) are electrically connected to the electronic control device (8).

As shown in FIG. 1, this engine includes a starting device.

The starting device includes a starter motor (41) and a key switch (42), and the starter motor (41) and the key switch (42) are electrically connected to the power source (29) via the electronic control device (8). The key switch (42) includes an OFF position, an ON position, and a start position.

The electronic control device (8) is configured to perform the following operation control.

A fuel injection amount and injection timing from the fuel injection valve (34) are set so as to reduce a rotational speed deviation between the target rotational speed and the actual rotational speed of the engine, and a rotational speed variation of the engine due to a load variation is reduced.

Opening degrees of the intake-air throttle valve (11) and the EGR valve (31) are adjusted according to the rotational speed of the engine, a load, an intake air amount, and an intake air temperature to adjust the intake air amount and an EGR rate.

When the key switch (42) is turned on to the start position, the starter motor (41) is driven to start the engine. When the key switch (42) is turned on to the ON position, an engine operation state is maintained by energization from the power source (29) to each part of the engine, and when the key switch (42) is turned on to the OFF position, fuel injection from the fuel injection valve (34) is stopped, and the engine is stopped.

This engine includes an exhaust treatment device.

As shown in FIG. 1, the exhaust treatment device includes the fuel injection device (3) that injects fuel (2) into the combustion chambers (1), the exhaust-air throttle valve (5) disposed in an exhaust-air path (4), the valve downstream-side DOC (6) disposed on the exhaust downstream side thereof, the DPF (7) disposed on the exhaust downstream side thereof, and the electronic control device (8) that controls an opening degree of the exhaust-air throttle valve (5) and fuel injection of the fuel injection device (3).

As compared to a configuration different from this engine, that is, a case where the exhaust-air throttle valve (5) is disposed on the exhaust downstream side of the DPF (7), in this engine, as shown in FIG. 1, the exhaust-air throttle valve (5) is disposed on the exhaust upstream side of the DPF (7). Therefore, the volume of the exhaust-air path (4) on the exhaust upstream side of the exhaust-air throttle valve (5) is reduced, a valve upstream-side exhaust-air pressure (P0) is rapidly increased by the decrease in the opening degree of the exhaust-air throttle valve (5), and the temperature rise efficiency of exhaust air (9) is high.

Further, in this engine, as shown in FIG. 1, the valve downstream-side DOC (6) and the DPF (7) are disposed on the exhaust downstream side of the exhaust-air throttle valve (5), so that valve ringing sound of the exhaust-air throttle valve (5) is hardly emitted to the outside of the exhaust-air path (4).

Each of the above elements will be described.

The combustion chamber (1) shown in FIG. 1 is formed in a cylinder. The fuel (2) is light oil. The exhaust-air throttle valve (5) is an electric on-off valve, and is electrically connected to the power source (29) via the electronic control device (8). The DOC is an abbreviation of a diesel oxidation catalyst, and is a through-flow type in which an oxidation catalyst component such as platinum or palladium is loaded on a ceramic honeycomb carrier, and oxidizes CO (carbon monoxide) and NO (nitrogen monoxide) in the exhaust air (9). The DPF is an abbreviation of a diesel particulate filter, and is a wall flow type in which the inlets and outlets of adjacent cells of the ceramic honeycomb are alternately closed, and captures PM in the exhaust air (9). The PM is an abbreviation of particulate matter.

The valve downstream-side DOC (6) and the DPF (7) are respectively accommodated on the exhaust upstream side and the exhaust downstream side of an exhaust treatment case (4a) disposed in the middle of the exhaust-air path (4).

This DPF system continuously oxidizes and burns PM deposited in the DPF (7) at a relatively low temperature by $NO_2$ (nitrogen dioxide) obtained by capturing the PM in the exhaust air (9) by the DPF (7) and oxidizing NO (nitrogen monoxide) in the exhaust air (9) by the valve downstream-side DOC (6), catalytically burns unburned fuel supplied to the exhaust air (9) by post injection of the common rail type fuel injection device (3) by the valve downstream-side DOC (6), and burns the PM deposited in the DPF (7) at a relatively high temperature to regenerate the DPF (7).

The exhaust treatment device has the following configuration for a regeneration process of the DPF (7).

Figure 2:
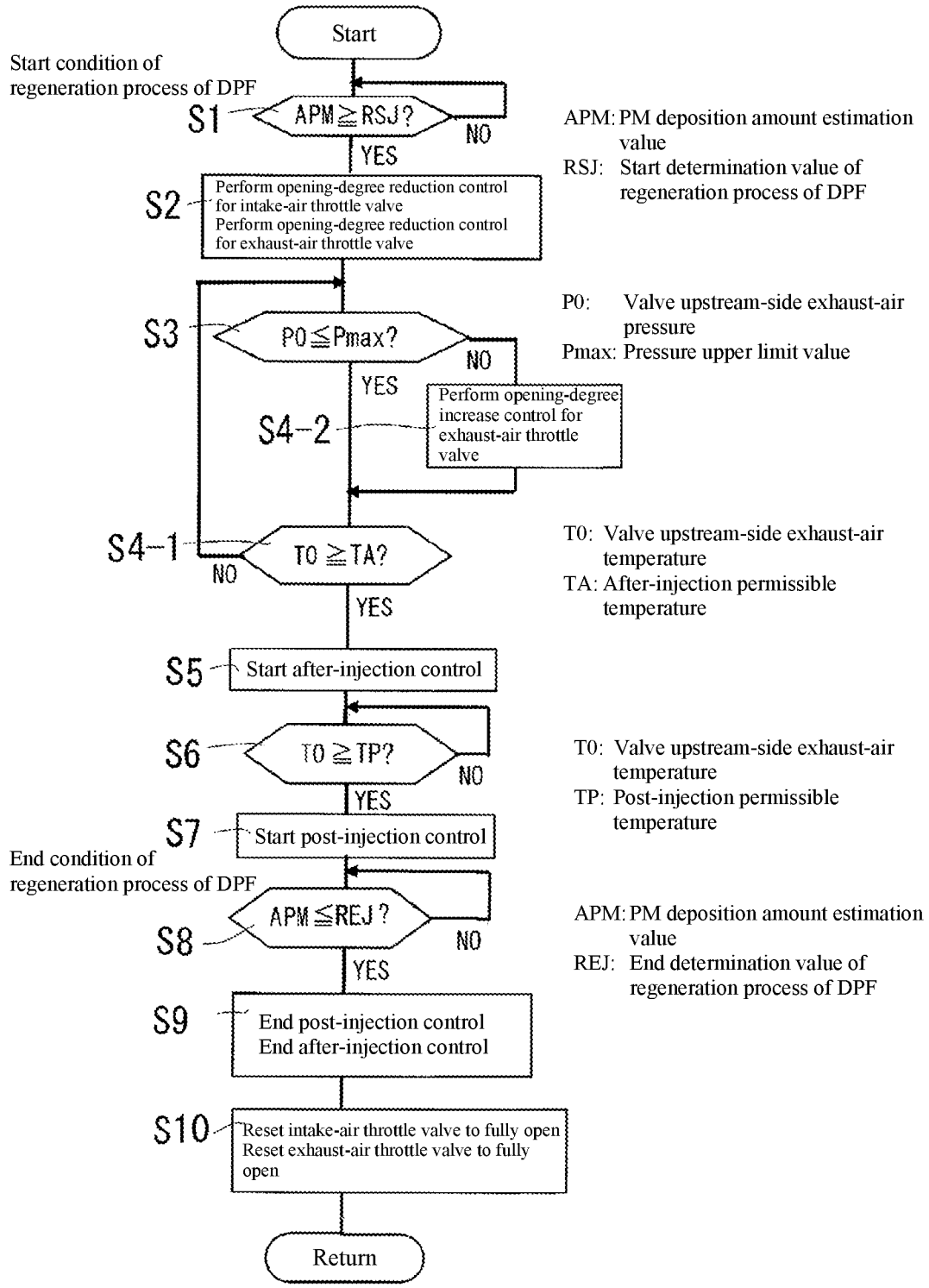
FIG. 2 is a flowchart of a regeneration process of a DPF of the engine in FIG. 1.

As shown in FIG. 2, when a start condition (S1) of the regeneration process of the DPF (7) in which the PM is deposited is satisfied, opening-degree reduction control (S2) for the exhaust-air throttle valve (5) is subsequently performed. When the exhaust air (9) reaches a temperature equal to or higher than a predetermined after-injection permissible temperature (TA), after-injection control is started thereafter (S5). When the exhaust air (9) reaches a temperature equal to or higher than a predetermined post-injection permissible temperature (TP) by combustion of after-injection fuel, post-injection control is subsequently started (S7). The PM deposited in the DPF (7) is incinerated by the exhaust air (9) increased in temperature by the catalytic combustion of the post-injection fuel in the valve downstream-side DOC (6) shown in FIG. 1.

This engine has the following advantages.

As shown in FIG. 2, after the start condition (S1) of the regeneration process of the DPF (7) is satisfied, an increase in back pressure due to a decrease in the opening degree of the exhaust-air throttle valve (5) and the combustion of the after-injection fuel occur. Therefore, the valve downstream-side DOC (6) shown in FIG. 1 is activated and the DPF (7) can be regenerated by post injection even during no-load and/or light-load operation in which the temperature rise efficiency of the exhaust air (9) is high and the exhaust-air temperature is low as compared with the case of the intake throttle.

In addition, in this engine, since the temperature of the exhaust air (9) is increased by the combustion of the after-injection fuel, the degree of decrease in the opening degree of the exhaust-air throttle valve (5) shown in FIG. 1 can be small, the output loss due to the back pressure is small, and the engine output can be increased.

In this engine, even in a case where an unburned deposit of unburned fuel or PM is deposited in the valve downstream-side DOC (6) and the catalyst function thereof is deteriorated due to continuation of the no-load and/or light-load operation with a low exhaust-air temperature, when the regeneration start condition (S1) of the DPF (7) is satisfied as shown in FIG. 2, the temperature of the exhaust air (9) is increased by a decrease in the opening degree of the exhaust-air throttle valve (5) or after injection, the unburned deposit is vaporized or burned, and the deteriorated catalyst function of the valve downstream-side DOC (6) shown in FIG. 1 can be recovered at the time of regeneration of the DPF (7).

Each element in the case of regeneration of the DPF (7) will be described.

As shown in FIG. 2, the start condition (S1) of the regeneration process of the DPF (7) is satisfied when a PM deposition amount estimation value (APM) deposited in the DPF (7) is equal to or larger than a start determination value (RSJ) of the regeneration process of the DPF (7). For the PM deposition amount estimation value (APM), there is, for example, a method in which a PM deposition amount estimation value calculation device (32) estimates the PM deposition amount estimation value based on a differential pressure ($\Delta P$) between the inlet and the outlet of the DPF (7) shown in FIG. 1. The PM deposition amount estimation value calculation device (32) includes a calculation unit of the electronic control device (8).

Types of injection performed in one combustion cycle from the fuel injection device (3) include pre injection (pilot injection), main injection, after injection, and post injection.

In a four-cycle engine, one combustion cycle includes an intake stroke, a compression stroke, an expansion stroke, and an exhaust stroke.

The pre injection (pilot injection) is an injection for suppressing ignition delay of the main injection fuel, and is started during the intake stroke or the compression stroke.

The main injection is a main injection for obtaining the output and is started before the compression top dead center.

The after injection is an injection for raising the temperature of the exhaust air (9), and is started during the expansion stroke after the main injection.

The post injection is an injection for raising the temperature of the exhaust air (9), and is started during the expansion stroke after the after injection. The post injection may be started during the exhaust stroke.

In the case of the regeneration process of the DPF (7) shown in FIG. 2, the after injection is set as follows.

The after-injection permissible temperature (TA) is set to 150° C. or higher and 700° C. or lower.

In the after-injection control, an inlet-side exhaust-air temperature (T1) of the valve downstream-side DOC (6) shown in FIG. 1 is set to be maintained at 400° C. or higher and 700° C. or lower.

The after-injection permissible temperature (TA) is a determination temperature for a valve upstream-side exhaust-air temperature (T0) detected by a valve upstream-side exhaust-air temperature sensor (19), and the valve upstream-side exhaust-air temperature (T0) is detected by the valve upstream-side exhaust-air temperature sensor (19), and is controlled by adjustment of the injection timing and the fuel injection amount by the electronic control device (8).

The inlet-side exhaust-air temperature (T1) of the valve downstream-side DOC (6) is estimated from the valve upstream-side exhaust-air temperature (T0) detected by the valve upstream-side exhaust-air temperature sensor (19), and is controlled by the adjustment of the injection timing and the fuel injection amount by the electronic control device (8).

In the after injection, the after-injection fuel started to be injected into the combustion chamber (1) in the expansion stroke is burned by the heat of the exhaust air (9), and even when the temperature of the exhaust air (9) is low due to no-load and low-load operations, the temperature of the exhaust air (9) is raised to a temperature at which the unburned deposit deposited in the valve downstream-side DOC (6) is vaporized or incinerated, and the catalyst function of the valve downstream-side DOC (6) deteriorated by the unburned deposit is recovered and the valve downstream-side DOC (6) is activated.

In the case of the regeneration process of the DPF (7) shown in FIG. 2, the post injection is set as follows.

The post-injection permissible temperature (TP) is set to 200° C. or higher and 700° C. or lower.

The post-injection permissible temperature (TP) is set to a temperature higher than the after-injection permissible temperature (TA).

In the post-injection control, the inlet-side exhaust-air temperature (T1) of the valve downstream-side DOC (6) is set to be maintained at 400° C. or higher and 700° C. or lower, and the inlet-side exhaust-air temperature (T2) of the DPF (7) is set to be maintained at 550° C. or higher and 700° C. or lower. In particular, the inlet-side exhaust-air temperature (T2) of the DPF (7) is desirably set to 700° C. or lower in order to prevent abnormal combustion of the deposited PM.

The post-injection permissible temperature (TP) is a determination temperature for the valve upstream-side exhaust-air temperature (T0) detected by the valve upstream-side exhaust-air temperature sensor (19), and the valve upstream-side exhaust-air temperature (T0) is detected by the valve upstream-side exhaust-air temperature sensor (19) and controlled by the electronic control device (8).

The inlet-side exhaust-air temperature (T1) of the valve downstream-side DOC (6) is controlled by the adjustment of the injection timing and the fuel injection amount by the electronic control device (8) based on the valve upstream-side exhaust-air temperature (T0) detected by the valve upstream-side exhaust-air temperature sensor (19).

The inlet-side exhaust-air temperature (T2) of the DPF (7) is detected by a DPF inlet-side exhaust-air temperature sensor (27), and is controlled by the adjustment of the injection timing and the fuel injection amount by the electronic control device (8).

When a DPF outlet-side exhaust-air temperature (T3) detected by a DPF outlet-side exhaust-air temperature sensor (33) reaches a temperature equal to or higher than a predetermined upper limit temperature, the after injection and the post injection are urgently stopped by the control of the electronic control device (8).

In the post injection, the post-injection fuel started to be injected into the combustion chamber in the expansion stroke or the exhaust stroke is catalytically burned by the valve downstream-side DOC (6), the temperature of the exhaust air (9) rises, and the PM accumulated in the DPF (7) is incinerated and removed.

As shown in FIG. 1, this engine includes the intake-air throttle valve (11) disposed in an intake-air path (10), and the opening degree of the intake-air throttle valve (11) is controlled by the electronic control device (8). In the regeneration process of the DPF (7) shown in FIG. 2 or the catalyst function recovery process of the valve downstream-side DOC (6) shown in FIG. 3, after the start condition (S1) of the regeneration process of the DPF (7) is satisfied or after a start condition (13) of a catalyst function recovery process of the valve downstream-side DOC (6) is satisfied, opening-degree reduction control (S2) (S15) for the exhaust-air throttle valve (5) and opening-degree reduction control (S2) (S15) for the intake-air throttle valve (11) are performed.

Therefore, in this engine, since intake throttle is performed together with exhaust throttle, the temperature rise efficiency of the exhaust air (9) increases due to the decrease in the intake amount.

In this engine, as shown in FIG. 2 or 3, when the valve upstream-side exhaust-air pressure (P0) exceeds a predetermined pressure upper limit value (Pmax) after the opening-degree reduction control (S2) (S15) for the exhaust-air throttle valve (5) is performed, opening-degree increase control (S4-2) (S17-2) for the exhaust-air throttle valve (5) is subsequently performed.

For this reason, in this engine, since the excessive pressure increase of the valve upstream-side exhaust-air pressure (P0) is suppressed, the exhaust-air throttle valve (5) and components on the upstream side thereof are unlikely to fail due to the pressure increase.

The pressure upper limit value (Pmax) is determined from specifications of the exhaust-air throttle valve (5), the EGR valve (31), the supercharger (26), and the like shown in FIG. 1, airtightness of a pipe of the exhaust-air path (4), and the like.

The exhaust-air throttle valve (5) is disposed in the middle of the exhaust-air path (4).

As shown in FIG. 1, this engine includes a calculation device (12) for the valve upstream-side exhaust-air pressure (P0). As shown in FIG. 5, the valve upstream-side exhaust-air pressure (P0) is calculated by calculation from a mass flow rate (G) of the exhaust air (9), the valve upstream-side exhaust-air temperature (T0), and the valve downstream-side exhaust-air pressure (P1). The calculation device (12) for the valve upstream-side exhaust-air pressure (P0) includes the calculation unit of the electronic control device (8).

In this engine, as shown in FIG. 5, since the valve upstream-side exhaust-air pressure (P0) can be accurately calculated by calculation from the mass flow rate (G) of the exhaust air (9) and the like, the control accuracy of the exhaust-air throttle valve (5) shown in FIG. 1 can be enhanced.

In this engine, the valve upstream-side exhaust-air pressure (P0) may be detected by an exhaust-air pressure sensor disposed on the exhaust upstream side of the exhaust-air throttle valve (5). In this case, since the valve upstream-side exhaust-air pressure (P0) can be quickly detected, the control accuracy of the exhaust-air throttle valve (5) shown in FIG. 1 can be enhanced.

When the valve upstream-side exhaust-air pressure (P0) is calculated by calculation, the following relational equation can be used.

The valve upstream-side exhaust-air pressure (P0) can be calculated by calculation from the mass flow rate (G) of the exhaust air (9), the valve upstream-side exhaust-air temperature (T0), and the valve downstream-side exhaust-air pressure (P1) by Equation 1 of FIG. 5.

The mass flow rate (G) of the exhaust air (9) can be calculated by calculation from a density ($\rho 0$) of the exhaust air (9) and a volume flow rate (V) of the exhaust air (9) by Equation 2 of FIG. 5.

The volume flow rate (V) of the exhaust air (9) can be calculated by calculation from the mass flow rate (G) of the exhaust air (9), a fuel injection amount (Q), and the like by Equation 3 of FIG. 5.

The fuel injection amount (Q) is a fuel injection amount obtained by adding the pre injection (pilot injection) per second, the main injection, the after injection, and the post injection.

Since the intake flow rate can be used as a substitute value for the exhaust-air flow rate, the calculation of Equation 2 may be performed by regarding the intake flow rate measured by the intake-air flow rate sensor (16) as the volume flow rate (V) of the exhaust air (9) instead of the calculation of the accurate volume flow rate (V) of the exhaust air (9) of Equation 3 of FIG. 5.

As shown in FIG. 1, this engine includes a differential pressure sensor (13) that detects the differential pressure ($\Delta P$) between the inlet and the outlet of the DPF (7), and an atmospheric pressure sensor (14) that detects an atmospheric pressure (P3). As shown in Equation 4 of FIG. 5, the valve downstream-side exhaust-air pressure (P1) is calculated by calculation from the differential pressure ($\Delta P$) between the inlet and the outlet of the DPF (7) and the atmospheric pressure (P3).

In this engine, as shown in FIG. 5, since the valve downstream-side exhaust-air pressure (P1) can be accurately calculated by calculation from the differential pressure ($\Delta P$) between the inlet and the outlet of the DPF (7) and the atmospheric pressure (P3), the control accuracy of the exhaust-air throttle valve (5) shown in FIG. 1 can be enhanced.

In this engine, the valve downstream-side exhaust-air pressure (P1) may be detected by an exhaust-air pressure sensor disposed on the exhaust downstream side of the exhaust-air throttle valve (5). In this case, since the valve downstream-side exhaust-air pressure (P1) can be quickly detected, the control accuracy of the exhaust-air throttle valve (5) shown in FIG. 1 can be enhanced.

This engine includes the valve upstream-side exhaust-air temperature sensor (19) as shown in FIG. 1. As shown in FIG. 5, the valve upstream-side exhaust-air temperature (T0) detected by the valve upstream-side exhaust-air temperature sensor (19) is used for calculation for the valve upstream-side exhaust-air pressure (P0), and is also used for temperature comparison determination between the valve upstream-side exhaust-air temperature (T0) and the after-injection permissible temperature (TA), and between the valve upstream-side exhaust-air temperature (T0) and the post-injection permissible temperature (TP) as shown in FIG. 2.

In this engine, since the calculation and the comparison determination are performed using the valve upstream-side exhaust-air temperature (T0) detected by the single valve upstream-side exhaust-air temperature sensor (19), the number of sensors can be reduced.

In this engine, the valve upstream-side exhaust-air pressure (P0) may be detected by the exhaust-air pressure sensor disposed on the exhaust upstream side of the exhaust-air throttle valve (5), the detection temperature of the valve upstream-side exhaust-air temperature sensor (19) may be used for comparison determination of the after-injection permissible temperature (TA), and the detection temperature of the valve downstream exhaust-air temperature sensor may be used for comparison determination of the post-injection permissible temperature (TP). In this case, detection of the valve upstream-side exhaust-air pressure (P0), comparison determination of the after-injection permissible temperature (TA), and comparison determination of the post-injection permissible temperature (TP) can be promptly performed.

As shown in FIG. 1, this engine includes a valve upstream-side DOC (17) disposed on the exhaust upstream side of the exhaust-air throttle valve (5).

In this engine, even in a case where an unburned deposit of unburned fuel or PM is deposited in the valve downstream-side DOC (6) and the catalyst function of the valve downstream-side DOC (6) is deteriorated due to continuation of the no-load and/or light-load operation, as shown in FIG. 2, when the start condition (S1) of the regeneration process of the DPF (7) is satisfied, the after-injection fuel or the post-injection fuel is catalytically burned by the valve upstream-side DOC (17) by the subsequent after injection or post injection, and the temperature of the exhaust air (9) is greatly risen. Therefore, the unburned deposit is quickly vaporized or burned, and the deteriorated catalyst function of the valve downstream-side DOC (6) shown in FIG. 1 can be recovered at the time of regeneration of the DPF (7).

The valve upstream-side DOC (17) is accommodated in a valve upstream-side DOC case (4b) disposed in the middle of the exhaust-air path (4). The valve upstream-side exhaust-air temperature sensor (19) is disposed between the valve upstream-side DOC (17) and the exhaust-air throttle valve (5).

In this engine, as shown in FIG. 1, a flow-through type oxidation catalyst in which a catalyst component is loaded on a honeycomb carrier through which the exhaust air (9) passes in the cells is used in the valve upstream-side DOC (17) and the valve downstream-side DOC (6).

Therefore, in this engine, as shown in FIG. 1, the flow-through type oxidation catalyst is used in the valve upstream-side DOC (17) and the valve downstream-side DOC (6), so that the output loss due to the back pressure is small and the engine output can be increased.

In this engine, as shown in FIG. 1, the diameter of the valve upstream-side DOC (17) is set smaller than the diameter of the valve downstream-side DOC (6).

Therefore, in the engine, the passage speed of the exhaust air (9) passing through the cells of the valve upstream-side DOC (17) is faster than the passage speed of the exhaust air (9) passing through the cells of the valve downstream-side DOC (6), so that an unburned deposit of unburned fuel or PM is less likely to deposit in the valve upstream-side DOC (17).

In this engine, as shown in FIG. 1, the (entire) cell density of the valve upstream-side DOC (17) is set larger than the cell density of the valve downstream-side DOC (6).

Therefore, in this engine, as shown in FIG. 1, the passage speed of the exhaust air (9) passing through the cells of the valve upstream-side DOC (17) is faster than the passage speed of the exhaust air (9) passing through the cells of the valve downstream-side DOC (6), so that an unburned deposit of unburned fuel or PM is less likely to deposit in the valve upstream-side DOC (17).

As shown in FIG. 3, the exhaust treatment device is configured such that the catalyst function recovery process of the valve downstream-side DOC (6) is performed, and in the catalyst function recovery process of the valve downstream-side DOC (6), the opening-degree reduction control (S15) for the exhaust-air throttle valve (5) is performed after the start condition (S13) of the catalyst function recovery process of the valve downstream-side DOC (6) whose function has deteriorated based on the deposition of the unburned deposit of the unburned fuel or PM is satisfied, the after-injection control is started (S18) after the exhaust air (9) reaches a temperature equal to or higher than the predetermined after-injection permissible temperature (TA), and the unburned deposit deposited in the valve downstream-side DOC (6) is vaporized or incinerated by the exhaust air (9) increased in temperature by the combustion of the after-injection fuel.

In this engine, even when the DPF (7) is not regenerated, as shown in FIG. 3, after the start condition (S13) of the catalyst function recovery of the valve downstream-side DOC (6) is satisfied, the temperature of the exhaust air (9) is increased by a decrease in the opening degree of the exhaust-air throttle valve (5) or after injection, the unburned deposit is vaporized or burned, and the deteriorated catalyst function of the valve downstream-side DOC (6) shown in FIG. 1 is recovered before regeneration of the DPF (7), so that deterioration of the catalyst function is unlikely to proceed. In addition, since there is no unburned deposit that is a cause of white smoke, generation of white smoke is also suppressed.

As shown in FIG. 3, the start condition (S13) of the catalyst function recovery process of the valve downstream-side DOC (6) is satisfied when an integrated value (tL) of the operating times of the no-load and light-load operations becomes equal to or larger than a predetermined start determination value (ISJ) of the catalyst function recovery process. The integrated value (tL) of the operating times of the no-load and light-load operations is calculated by an operating time integration device (18) shown in FIG. 1 based on the fact that the valve upstream-side exhaust-air temperature (T0) is equal to or lower than a determination temperature (LJ) for no-load and light-load operations. The operating time integration device (18) includes the calculation unit of the electronic control device (8).

In the case of the catalyst function recovery process of the valve downstream-side DOC (6) shown in FIG. 3, the after injection is set as follows.

The after-injection permissible temperature (TA) is set to 150° C. or higher and 700° C. or lower.

In the after-injection control, the inlet-side exhaust-air temperature (T1) of the valve downstream-side DOC (6) shown in FIG. 1 is set to be maintained at 180° C. or higher and 700° C. or lower.

In the after injection, the after-injection fuel injected into the combustion chamber in the expansion stroke is burned by the heat of the exhaust air (9), and even when the temperature of the exhaust air (9) is low due to no-load and low-load operations, the temperature of the exhaust air (9) is raised to a temperature at which the unburned deposit deposited in the valve downstream-side DOC (6) is vaporized or incinerated, and the catalyst function of the valve downstream-side DOC (6) deteriorated by the unburned deposit is recovered, so that the deterioration of the catalyst function is unlikely to proceed.

As shown in FIG. 1, this engine includes the operating time integration device (18) that integrates operating times of no-load and/or light-load operation. As shown in FIG. 3, when the integrated value (tL) of the operating times of the no-load and/or light-load operation reaches the predetermined start determination value (ISJ) of the catalyst function recovery process, the start condition (S13) of the catalyst function recovery process of the valve downstream-side DOC (6) is satisfied.

Therefore, in this engine, since the improvement of the catalyst function can be started at a time when the probability of the deterioration of the catalyst function of the valve downstream-side DOC (6) is high, unnecessary exhaust throttle and after injection can be eliminated.

As shown in FIG. 1, the valve upstream-side DOC (17) disposed on the exhaust upstream side of the exhaust-air throttle valve (5) is provided. As shown in FIG. 4, the catalyst function recovery process of the valve upstream-side DOC (17) is performed. In the catalyst function recovery process of the valve upstream-side DOC (17), the opening-degree reduction control (S15) for the exhaust-air throttle valve (5) is performed after the start condition (S13) of the catalyst function recovery process of the valve upstream-side DOC (17) whose function has deteriorated based on the deposition of the unburned deposit of the unburned fuel or PM is satisfied, the after-injection control is started (S18) after the exhaust air (9) reaches a temperature equal to or higher than the predetermined after-injection permissible temperature (TA), the post-injection control is started (S18-3) after the exhaust air (9) reaches a temperature equal to or higher than the predetermined post-injection permissible temperature (TP) by the combustion of the after-injection fuel, the post-injection fuel is burned by the combustion heat of the after-injection fuel, and the unburned deposit deposited in the valve upstream-side DOC (17) is vaporized or incinerated by the heat of the exhaust air (9) increased in temperature shown in FIG. 1.

In this engine, even in a case where an unburned deposit of unburned fuel or PM is deposited in the valve upstream-side DOC (17) shown in FIG. 1 and the catalyst function thereof is deteriorated due to continuation of the no-load and/or light-load operation with a low exhaust-air temperature, when the start condition (S13) of the catalyst function regeneration of the valve upstream-side DOC (17) is satisfied as shown in FIG. 4, the temperature of the exhaust air (9) is increased by a decrease in the opening degree of the exhaust-air throttle valve (5) shown in FIG. 1 or combustion of the after injection or the post injection, the unburned deposit is vaporized or burned by the heat of the exhaust air (9), and the deteriorated catalyst function of the valve upstream-side DOC (17) is recovered before regeneration of the DPF (7), so that the deterioration of the catalyst function is unlikely to proceed. Therefore, the DPF (7) can be regenerated even when no-load and/or light-load operation is continued. In addition, since there is no unburned deposit that is a cause of white smoke, generation of white smoke is also suppressed.

In this engine, since the temperature of the exhaust air (9) shown in FIG. 1 is increased by the combustion of the after-injection fuel, the degree of decrease in the opening degree of the exhaust-air throttle valve (5) can be small, the output loss due to the back pressure is small, and the engine output can be increased.

As shown in FIG. 1, this engine includes the operating time integration device (18) that integrates operating times of no-load and/or light-load operation. As shown in FIG. 4, when the integrated value (tL) of the operating times of the no-load and/or light-load operation reaches the predetermined start determination value (ISJ) of the catalyst function recovery process, the start condition (S13) of the catalyst function recovery process of the valve upstream-side DOC (17) is satisfied.

Therefore, in this engine, since the catalyst function recovery process can be started under a situation where the probability of the deterioration of the catalyst function of the valve upstream-side DOC (17) shown in FIG. 1 is high, unnecessary exhaust throttle, after injection, and post injection can be eliminated.

The start condition (S13) of the catalyst function recovery process of the valve upstream-side DOC (17) shown in FIG. 4 is not limited to the case where the integrated value (tL) of the operating times of no-load and/or light-load operation reaches the predetermined start determination value (ISJ) of the catalyst function recovery process, and may be satisfied when the valve upstream-side exhaust-air pressure (P0) shown in FIG. 1 or the number of regeneration processes of the DPF (7) shown in FIG. 1 reaches the predetermined start determination value of the catalyst function recovery process.

In this engine, in any case, the catalyst function recovery process can be started under a situation where the probability of the degradation of the catalyst function of the valve upstream-side DOC (17) due to the unburned deposit is high, so that unnecessary exhaust throttle, after injection, and post injection can be eliminated.

When the regeneration process of the DPF (7) is set as the start condition (S13), the number of regeneration processes is counted by the electronic control device (8), when the number of counts of the regeneration process reaches a predetermined value (for example, 5 times), the start condition (S13) is satisfied, and when the catalyst function recovery process ends, the number of counts of the regeneration process is reset to 0.

In the case of the regeneration process of the DPF (7) shown in FIG. 2, the inlet-side exhaust-air temperature (T2) of the DPF (7) is set to be higher than in the case of the catalyst function recovery process of the valve upstream-side DOC (17) shown in FIG. 4.

In this engine, in the case of the regeneration process of the DPF (7), the inlet-side exhaust-air temperature (T2) of the DPF (7) increases, so that the DPF (7) can be reliably regenerated.

In the case of the regeneration process of the DPF (7) shown in FIG. 2, the injection amount of the after-injection fuel is set to be smaller than in the case of the catalyst function recovery process of the valve upstream-side DOC (17) shown in FIG. 4.

In this engine, in the case of the regeneration process of the DPF (7), since the injection amount of the after-injection fuel is small, the combustion heat and the post-injection fuel burned by the combustion heat are also small, and a large amount of the post-injection fuel passes through the valve upstream-side DOC (17) and is catalytically burned in the valve downstream-side DOC (6), so that the inlet-side exhaust-air temperature (T2) of the DPF (7) increases. Therefore, the DPF (7) can be reliably regenerated.

In the case of the catalyst function recovery process of the valve upstream-side DOC (17), since there is a large amount of the after-injection fuel, a large amount of the post-injection fuel is burned on the upstream side of the valve upstream-side DOC (17) by the combustion heat, and the unburned deposit deposited in the valve upstream-side DOC (17) is vaporized or incinerated by the combustion heat. Thus, the catalyst function of the valve upstream-side DOC (17) can be reliably restored.

In the case of the regeneration process of the DPF (7) shown in FIG. 2, the injection amount of the post-injection fuel is set to be larger than in the case of the catalyst function recovery process of the valve upstream-side DOC (17) shown in FIG. 4.

In this engine, in the case of the regeneration process of the DPF (7), since the injection amount of the post-injection fuel is large, a large amount of the post-injection fuel passes through the valve upstream-side DOC (17) shown in FIG. 1 and is catalytically burned in the valve downstream-side DOC (6), so that the inlet-side exhaust-air temperature (T2) of the DPF (7) increases. Therefore, the DPF (7) can be reliably regenerated.

In this engine, the flow of the regeneration process of the DPF (7) by the electronic control device (8) shown in FIG. 1 is as follows.

As shown in FIG. 2, in step (S1), it is determined whether or not the start condition of the regeneration process of the DPF (7) is satisfied. Specifically, it is determined whether or not the PM deposition amount estimation value (APM) of the DPF (7) reaches a value equal to or larger than the start determination value (RSJ) of the regeneration process of the DPF (7). The PM deposition amount estimation value (APM) of the DPF (7) is calculated by the PM deposition amount estimation value calculation device (32) based on the differential pressure ($\Delta P$) between the inlet and the outlet of the DPF (7) shown in FIG. 1. The PM deposition amount estimation value calculation device (32) includes the calculation unit of the electronic control device (8). The PM deposition amount estimation value (APM) of the DPF (7) may be calculated by a method other than calculation by the differential pressure ($\Delta P$).

As shown in FIG. 2, the determination in step (S1) is repeated until affirmative determination is made, and when the affirmative determination is made, the process proceeds to step (S2).

As shown in FIG. 2, in step (S2), the opening-degree reduction control for the intake-air throttle valve (11) and the opening-degree reduction control for the exhaust-air throttle valve (5) are performed, and the process proceeds to step (S3).

The opening-degree reduction control for the intake-air throttle valve (11) and the exhaust-air throttle valve (5) in step (S2) is performed by the electronic control device (8)

controlling an actuator (11a) that drives the intake-air throttle valve (11) and an actuator (5a) that drives the exhaust-air throttle valve (5).

As shown in FIG. 2, in step (S3), it is determined whether or not the valve upstream-side exhaust-air pressure (P0) is equal to or lower than the pressure upper limit value (Pmax), and when the affirmative determination is made, the process proceeds to step (S4-1).

In step (S4-1), it is determined whether or not the valve upstream-side exhaust-air temperature (T0) is equal to or higher than the after-injection permissible temperature (TA), and when the affirmative determination is made, the process proceeds to step (S5).

In step (S5), the after-injection control is started, and the process proceeds to step (S6).

When the determination in step (S3) is negative, the process proceeds to step (S4-2), where the opening-degree increase control for the exhaust-air throttle valve (5) is performed, and the process proceeds to step (S4-1).

The opening-degree increase control for the exhaust-air throttle valve (5) in step (S4-2) is performed by the electronic control device (8) controlling the actuator (5a) that drives the exhaust-air throttle valve (5).

When the determination in step (S4-1) is negative, the process returns to step (S3).

In step (S6), it is determined whether or not the valve upstream-side exhaust-air temperature (T0) is equal to or higher than the post-injection permissible temperature (TP). The determination in step (S6) is repeated until the affirmative determination is made, and when the affirmative determination is made, the process proceeds to step (S7).

In step (S7), the post-injection control is started, and the process proceeds to step (S8).

In step (S8), it is determined whether or not an end condition of the regeneration process of the DPF (7) is satisfied. Specifically, the end condition is that the PM deposition amount estimation value (APM) of the DPF (7) reaches a value equal to or lower than an end determination value (REJ) of the regeneration process of the DPF (7), and in step (S8), it is determined whether or not this end condition is affirmed.

The determination in step (S8) is repeated until the affirmative determination is made, and when the affirmative determination is made, the process proceeds to step (S9).

In step (S9), the post-injection control is ended, and the after-injection control is also ended, and the process proceeds to step (S10).

In step (S10), the intake-air throttle valve (11) is reset to fully open, and the exhaust-air throttle valve (5) is also reset to fully open, and the process returns to step (S1).

The PM deposition amount estimation value (APM) of the DPF (7) in step (S8) is calculated by the PM deposition amount estimation value calculation device (32) based on the differential pressure ($\Delta P$) between the inlet and the outlet of the DPF (7).

The end condition of the regeneration process of the DPF (7) in step (S8) may be that the inlet-side exhaust-air temperature (T2) of the DPF (7) shown in FIG. 1 is maintained at a value equal to or higher than a predetermined regeneration process temperature of the DPF (7) for a predetermined time.

In this engine, the flow of the catalyst function recovery process of the valve downstream-side DOC (6) by the electronic control device (8) shown in FIG. 1 is as follows.

As shown in FIG. 3, in step (S11), it is determined whether or not the valve upstream-side exhaust-air temperature (T0) reaches a value equal to or lower than the determination temperature (LJ) for no-load and light-load operations. The determination in step (S11) is repeated until the affirmative determination is made, and the process proceeds to step (S12) when the affirmative determination is made.

In step (S11), it may be determined whether or not the inlet-side exhaust-air temperature (T1) of the valve downstream-side DOC (6) reaches a value equal to or lower than the determination temperature (LJ) for no-load and light-load operations.

In step (S12), the no-load and light-load operation times are integrated, and the process proceeds to step (S13).

In step (S13), it is determined whether or not the start condition of the catalyst function recovery process is satisfied. Specifically, it is determined whether or not the integrated value (tL) of the operating times of the no-load and light-load operations reaches a value equal to or larger than the start determination value (ISJ) of the catalyst function recovery process, and the process proceeds to step (S14) when the affirmative determination is made. When the determination is negative in step (S13), the process returns to step (S11).

In step (S14), the integrated value (tL) of the operating times of the no-load and light-load operations integrated in step (S12) is reset to 0, the integration of the catalyst function recovery processing time performed afterwards is started, and the process proceeds to step (S15).

In step (S15), the opening-degree reduction control for the intake-air throttle valve (11) and the opening-degree reduction control for the exhaust-air throttle valve (5) are performed, and the process proceeds to step (S16).

The opening-degree reduction control for the intake-air throttle valve (11) and the exhaust-air throttle valve (5) in step (S15) is performed similarly to the case of step (S2).

In step (S16), it is determined whether or not the valve upstream-side exhaust-air pressure (P0) is equal to or lower than the pressure upper limit value (Pmax), and when the affirmative determination is made, the process proceeds to step (S17-1).

In step (S17-1), it is determined whether or not the valve upstream-side exhaust-air temperature (T0) is equal to or higher than the after-injection permissible temperature (TA), and when the affirmative determination is made, the process proceeds to step (S18).

In step (S18), the after-injection control is started, and the process proceeds to step (S19).

When the determination in step (S16) is negative, the process proceeds to step (S17-2), where the opening-degree increase control for the exhaust-air throttle valve (5) is performed, and the process proceeds to step (S17-1).

The opening-degree reduction control for the exhaust-air throttle valve (5) in step (S17-1) is performed similarly to the case of step (S4-2).

When the determination in step (S17-1) is negative, the process returns to step (S16).

In step (S19), it is determined whether or not the end condition of the catalyst function recovery process is satisfied. Specifically, the end condition is that an integrated value (tI) of the catalyst function recovery processing time reaches a value equal to or larger than an end determination value (IEJ) of the catalyst function recovery process, and in step (S19), it is determined whether or not this end condition is satisfied.

The determination in step (S19) is repeated until the affirmative determination is made, and when the affirmative determination is made, the process proceeds to step (S20).

In step (S20), the after-injection control is ended, and the process proceeds to step (S21).

In step (S21), the intake-air throttle valve (11) is reset to fully open, and the exhaust-air throttle valve (5) is also reset to fully open, the integrated value (tI) of the integration of the catalyst function recovery processing time in the lower stage of step (S14) is reset to 0, and the process returns to step (S11). The integrated value (tL) of the operating times of the no-load and light-load operations in the upper stage of step (S14) may be reset to 0 not in step (S14) but in step (S21).

In this engine, the flow of the catalyst function recovery process of the valve upstream-side DOC (17) by the electronic control device (8) shown in FIG. 4 substantially coincides with the flow of the catalyst function recovery process of the valve downstream-side DOC (6) shown in FIG. 3.

The difference from the flow of FIG. 3 is that step (S18-2) and step (S18-3) are set after step (S18), and step (S20') similar to step (S20) is set instead of step (S20) after step (S19).

That is, when the after-injection control is started in step (S18), the process proceeds to step (S18-2).

In step (S18-2), it is determined whether or not the valve upstream-side exhaust-air temperature (T0) is equal to or higher than the post-injection permissible temperature (TP). The determination in step (S18-2) is repeated until the affirmative determination is made, and when the affirmative determination is made, the process proceeds to step (S18-3).

In step (S18-3), the post-injection control is started, and the process proceeds to step (S19).

When it is determined in step (S19) that the end condition of the catalyst function recovery process is satisfied, the process proceeds to step (S20').

In step (S20'), the post-injection control and the after-injection control are ended, and the process proceeds to step (S21).

Each of the processes shown in FIGS. 2 to 4 is executed independently, and is not executed simultaneously. When any of the processes is started, the other processes are not started until the process ends. The catalyst function recovery process of the valve downstream-side DOC (6) of FIG. 3 and the catalyst function recovery process of the valve upstream-side DOC (17) of FIG. 4 may be alternately performed one by one, the former may be performed once and the latter may be performed a plurality of times (for example, twice or three times), which are alternately performed, or the former may be performed a plurality of times (for example, twice or three times) and the latter may be performed once, which are alternately performed.

DESCRIPTION OF REFERENCE SIGNS (1): Combustion chamber
(2): Fuel
(3): Fuel injection device
(4): Exhaust-air path
(5): Exhaust-air throttle valve
(6): Valve downstream-side DOC
(7): DPF
(8): Electronic control device
(9): Exhaust air
(10): Intake-air path
(11): Intake-air throttle valve
(12): Calculation device for valve upstream-side exhaust-air pressure
(13): Differential pressure sensor
(14): Atmospheric pressure sensor
(15): Calculation device for exhaust-air flow rate
(16): Intake-air flow rate sensor
(17): Valve upstream-side DOC
(18): Operating time integration device
(19): Valve upstream-side exhaust-air temperature sensor
(20): Intake air
(S1): Start condition of regeneration process of DPF
(S2): Opening-degree reduction control for exhaust-air throttle valve
(S4-2): Opening-degree increase control for exhaust-air throttle valve
(S5): Start after-injection control
(S7): Start post-injection control
(S20): Start post-injection control
(T0): Valve upstream-side exhaust-air temperature
(TA): After-injection permissible temperature
(TP): Post-injection permissible temperature
(P0): Valve upstream-side exhaust-air pressure
(Pmax): Pressure upper limit value
(G): Mass flow rate of exhaust air
(P1): Valve downstream-side exhaust-air pressure
($\Delta$P): Differential pressure
(P3): Atmospheric pressure

The invention claimed is:

1. A diesel engine comprising:
a fuel injection device configured to inject fuel into a combustion chamber;
an exhaust-air throttle valve disposed in an exhaust-air path;
a valve downstream-side DOC disposed on an exhaust downstream side of the exhaust-air throttle valve;
a DPF disposed on an exhaust downstream side of the valve downstream-side DOC; and
an electronic control device configured to control an opening degree of the exhaust-air throttle valve and fuel injection of the fuel injection device,
wherein a regeneration process of the DPF is performed, and
wherein, in the regeneration process of the DPF, opening-degree reduction control for the exhaust-air throttle valve is performed after a start condition of the regeneration process of the DPF in which PM is deposited is satisfied, after-injection control is started after exhaust air reaches a temperature equal to or higher than a predetermined after-injection permissible temperature, post-injection control is started after the exhaust air reaches a temperature equal to or higher than a predetermined post-injection permissible temperature by combustion of after-injection fuel, and the PM deposited in the DPF is incinerated by the exhaust air increased in temperature by catalytic combustion of post-injection fuel in the valve downstream-side DOC.

2. The diesel engine according to claim 1, further comprising an intake-air throttle valve disposed in an intake-air path, an opening degree of the intake-air throttle valve being controlled by the electronic control device,
wherein, in the regeneration process of the DPF, the opening-degree reduction control for the exhaust-air throttle valve and opening-degree reduction control for the intake-air throttle valve are performed after the start condition of the regeneration process of the DPF is satisfied.

3. The diesel engine according to claim 1, wherein, in the regeneration process of the DPF, the opening-degree reduction control for the exhaust-air throttle valve is performed, and when a valve upstream-side exhaust-air pressure exceeds a predetermined pressure upper limit value, opening-degree increase control for the exhaust-air throttle valve is subsequently performed.

4. The diesel engine according to claim 3, further comprising a calculation device for the valve upstream-side exhaust-air pressure,
wherein the valve upstream-side exhaust-air pressure is calculated by calculation from a mass flow rate of the exhaust air, a valve upstream-side exhaust-air temperature, and a valve downstream-side exhaust-air pressure.

5. The diesel engine according to claim 4, further comprising:
a differential pressure sensor configured to detect a differential pressure between an inlet and an outlet of the DPF; and
an atmospheric pressure sensor configured to detect an atmospheric pressure,
wherein the valve downstream-side exhaust-air pressure is calculated by calculation from the differential pressure between the inlet and the outlet of the DPF and the atmospheric pressure.

6. The diesel engine according to claim 4, further comprising a valve upstream-side exhaust-air temperature sensor,
wherein the valve upstream-side exhaust-air temperature detected by the valve upstream-side exhaust-air temperature sensor is used for calculation for the valve upstream-side exhaust-air pressure, and is also used for temperature comparison determination between the valve upstream-side exhaust-air temperature and the after-injection permissible temperature, and between the valve upstream-side exhaust-air temperature and the post-injection permissible temperature.

7. The diesel engine according to claim 1, further comprising a valve upstream-side DOC disposed on an exhaust upstream side of the exhaust-air throttle valve.

8. The diesel engine according to claim 7, wherein
a flow-through type oxidation catalyst in which a catalyst component is loaded on a honeycomb carrier through which the exhaust air passes in cells is used in the valve upstream-side DOC and the valve downstream-side DOC.

9. The diesel engine according to claim 1,
wherein a catalyst function recovery process of the valve downstream-side DOC is performed, and
wherein, in the catalyst function recovery process of the valve downstream-side DOC, opening-degree reduction control for the exhaust-air throttle valve is performed after a start condition of the catalyst function recovery process of the valve downstream-side DOC whose function has deteriorated based on deposition of an unburned deposit of unburned fuel or PM is satisfied, the after-injection control is started after the exhaust air reaches a temperature equal to or higher than the predetermined after-injection permissible temperature, and the unburned deposit deposited in the valve downstream-side DOC is vaporized or incinerated by the exhaust air increased in temperature by the combustion of the after-injection fuel.

10. The diesel engine according to claim 9, further comprising an operating time integration device configured to integrate operating times of no-load and/or light-load operation,
wherein, when an integrated value of the operating times of the no-load and/or light-load operation reaches a predetermined start determination value of the catalyst function recovery process, the start condition of the catalyst function recovery process of the valve downstream-side DOC is satisfied.

11. The diesel engine according to claim 1, further comprising a valve upstream-side DOC disposed on an exhaust upstream side of the exhaust-air throttle valve,
wherein a catalyst function recovery process of the valve upstream-side DOC is performed, and
wherein, in the catalyst function recovery process of the valve upstream-side DOC, opening-degree reduction control for the exhaust-air throttle valve is performed after a start condition of the catalyst function recovery process of the valve upstream-side DOC whose function has deteriorated based on deposition of an unburned deposit of unburned fuel or PM is satisfied, the after-injection control is started after the exhaust air reaches a temperature equal to or higher than the predetermined after-injection permissible temperature, the post-injection control is started after the exhaust air reaches a temperature equal to or higher than the predetermined post-injection permissible temperature by combustion of the after-injection fuel, the post-injection fuel is burned by combustion heat of the after-injection fuel, and the unburned deposit deposited in the valve upstream-side DOC is vaporized or incinerated by heat of the exhaust air increased in temperature.

12. The diesel engine according to claim 11, further comprising an operating time integration device configured to integrate operating times of no-load and/or light-load operation,
wherein, when an integrated value of the operating times of the no-load and/or light-load operation reaches a predetermined start determination value of the catalyst function recovery process, the start condition of the catalyst function recovery process of the valve upstream-side DOC is satisfied.

13. The diesel engine according to claim 11, wherein, when a valve upstream-side exhaust-air pressure reaches a predetermined start determination value of the catalyst function recovery process, the start condition of the catalyst function recovery process of the valve upstream-side DOC is satisfied.

14. The diesel engine according to claim 11, wherein, when the number of regeneration processes of the DPF reaches the predetermined start determination value of the catalyst function recovery process, the start condition of the catalyst function recovery process of the valve upstream-side DOC is satisfied.

15. A diesel engine comprising:
a fuel injection device configured to inject fuel into a combustion chamber;
an exhaust-air throttle valve disposed in an exhaust-air path;
a valve downstream-side DOC disposed on an exhaust downstream side of the exhaust-air throttle valve;
a DPF disposed on an exhaust downstream side of the valve downstream-side DOC; and
an electronic control device configured to control an opening degree of the exhaust-air throttle valve and fuel injection of the fuel injection device,
wherein a regeneration process of the DPF and a regeneration process of the valve downstream-side DOC are performed,
wherein, in the regeneration process of the DPF, post-injection control is started after a start condition of the regeneration process of the DPF in which PM is deposited is satisfied, and the PM deposited in the DPF is incinerated by exhaust air increased in temperature by catalytic combustion of post-injection fuel in the valve downstream-side DOC, and wherein, in a catalyst function recovery process of the valve downstream-side DOC, opening-degree reduction control for the exhaust-air throttle valve is performed after a start condition of the catalyst function recovery process of the valve downstream-side DOC whose function has deteriorated based on deposition of an unburned deposit of unburned fuel or the PM is satisfied, after-injection control is started after the exhaust air reaches a temperature equal to or higher than a predetermined after-injection permissible temperature, and the unburned deposit deposited in the valve downstream-side DOC is vaporized or incinerated by the exhaust air increased in temperature by combustion of after-injection fuel.

16. The diesel engine according to claim 15, further comprising an operating time integration device configured to integrate operating times of no-load and/or light-load operation, wherein, when an integrated value of the operating times of the no-load and/or light-load operation reaches a predetermined start determination value of the catalyst function recovery process, a start condition of the catalyst function recovery process of the valve downstream-side DOC is satisfied.

17. A diesel engine comprising:
a fuel injection device configured to inject fuel into a combustion chamber;
an exhaust-air throttle valve disposed in an exhaust-air path;
a valve upstream-side DOC disposed on an exhaust upstream side of the exhaust-air throttle valve;
a DPF disposed on an exhaust downstream side of the exhaust-air throttle valve; and
an electronic control device configured to control an opening degree of the exhaust-air throttle valve and fuel injection of the fuel injection device,
wherein a regeneration process of the DPF and a catalyst function recovery process of the valve upstream-side DOC are performed,
wherein, in the regeneration process of the DPF, post-injection control is started after a start condition of the regeneration process of the DPF in which PM is deposited is satisfied, post-injection fuel is catalytically burned in the valve upstream-side DOC, and the PM deposited in the DPF is incinerated by heat of exhaust air increased in temperature, and wherein, in the catalyst function recovery process of the valve upstream-side DOC, opening-degree reduction control for the exhaust-air throttle valve is performed after a start condition of the catalyst function recovery process of the valve upstream-side DOC whose function has deteriorated based on deposition of an unburned deposit of unburned fuel or the PM is satisfied, after-injection control is started after the exhaust air reaches a temperature equal to or higher than a predetermined after-injection permissible temperature, post-injection control is started after the exhaust air reaches a temperature equal to or higher than a predetermined post-injection fuel permissible temperature by combustion of after injection fuel, the post-injection fuel is burned by combustion heat of the after-injection fuel, and the unburned deposit deposited in the valve upstream-side DOC is vaporized or incinerated by heat of the exhaust air increased in temperature.

18. The diesel engine according to claim 17, further comprising an operating time integration device configured to integrate operating times of no-load and/or light-load operation, wherein, when an integrated value of the operating times of the no-load and/or light-load operation reaches a predetermined start determination value of the catalyst function recovery process, the start condition of the catalyst function recovery process of the valve upstream-side DOC is satisfied.

19. The diesel engine according to claim 17, wherein, when a valve upstream-side exhaust-air pressure reaches a predetermined start determination value of the catalyst function recovery process, the start condition of the catalyst function recovery process of the valve upstream-side DOC is satisfied.

20. The diesel engine according to claim 17, wherein, when the number of regeneration processes of the DPF reaches a predetermined start determination value of the catalyst function recovery process, the start condition of the catalyst function recovery process of the valve upstream-side DOC is satisfied.

* * * * *